United States Patent [19]

Silken

[11] 4,291,735
[45] Sep. 29, 1981

[54] ROUTER GUIDE

[76] Inventor: Howard Silken, 9676 Bridle Path Ct., Davie, Fla. 33328

[21] Appl. No.: 129,175

[22] Filed: Mar. 10, 1980

[51] Int. Cl.³ .............................................. B27C 5/10
[52] U.S. Cl. ................................. 144/136 C; 409/182
[58] Field of Search ........... 144/134 R, 134 D, 136 C, 144/323; 409/182; 51/170 R, 170 PT; 145/129

[56] References Cited

U.S. PATENT DOCUMENTS

| | | | |
|---|---|---|---|
| 2,952,281 | 9/1960 | Weber | 144/134 D |
| 3,635,268 | 1/1972 | Lange | 144/136 C |
| 4,044,805 | 8/1977 | Gronholz | 144/134 D |
| 4,143,691 | 3/1979 | Robinson | 144/136 C |

*Primary Examiner*—W. D. Bray
*Attorney, Agent, or Firm*—Oltman and Flynn

[57] ABSTRACT

The present router guide has a guide plate with a central opening for passing the router bit, and an eccentric periphery and a groove in the top extending parallel to that periphery. A slide is coupled to the guide plate at the groove and it presents a straight edge disposed beyond the guide plate for sliding engagement with a reference surface to guide the router bit along a path parallel to that surface. The slide can be clamped to the guide plate at any selected position along its eccentric periphery, thereby determining the spacing of the router bit from the straight edge on the slide. The coupling between the slide and the guide plate at the latter's groove keeps the straight edge on the slide perpendicular to a radius from the router bit out to the slide. The guide plate has a series of bottom recesses arranged in a spiral around its central opening and each providing a possible location for a pivot pin when the router is used to cut a circular groove in a workpiece.

14 Claims, 10 Drawing Figures

4,291,735

ROUTER GUIDE

SUMMARY OF THE INVENTION

This invention relates to a router guide.

An important aspect of this invention relates to the problem that faces a router operator who wants to make a groove wider than the diameter of the router bit he has on hand. This applies, in particular, when making a dado groove or plough where the guide for controlling the location of the groove is a straight edge clamped to the workpiece. The usual technique prior to the present invention was to make the first cut of the groove by engaging the edge of the circular router base against the clamped straight edge and moving the router so that this edge of its base is kept in contact with the straight edge. To make the groove a little wider, the operator then had to unclamp the straight edge and reclamp it in a new location on the workpiece to displace it as far from its original position as the exact amount the operator wanted to increase the width of the groove. The operator then took a second pass with the router, thus making the groove that much wider. The problem with this method is that once the clamps on the straight edge are removed, it is very difficult to move the straight edge a precise small amount on the workpiece because of the difficulty of making small measurements (e.g., 1/100th inch) with a standard ruler. Also, if in its second clamped position the straight edge is not absolutely parallel to its clamped position, the result will be a tapered groove.

One way to avoid the necessity of unclamping the straight edge and moving it to a new position on the workpiece is to position a shim between the router base and the straight edge in the second pass of the router, so that the second cut will be displaced from the first by the thickness of the shim. However, shims of the desired thicknesses may not be readily available, and if two or more shims are used the positioning accuracy may not be satisfactory.

A principal object of the present invention is to provide a router guide which avoids these difficulties and makes it easier for a router operator to make a groove wider than the diameter of the router bit.

Also, the present router guide makes it easier to cut two or more precisely positioned parallel grooves in a workpiece.

In the presently-preferred embodiment, the present router guide comprises a base plate for attachment to, or replacement of, the usual router base. This base plate has a central opening for passing the router bit and an eccentric peripheral edge which progresses along a spiral path from a minimum radius point to a maximum radius point. The base plate is rotatably adjustable with respect to a slide which is releasably clamped to it at its peripheral edge. The slide presents a flat edge for sliding engagement with a reference surface, such as a straight edge clamped to the workpiece or an edge of the workpiece itself, to move the router bit along a path parallel to the reference surface. The spacing of the router bit from the reference surface may be changed by rotatably adjusting the base plate with respect to the slide.

Additional objects and advantages of the present invention will be apparent from the following detailed description of several presently preferred embodiments thereof, which are illustrated in the accompanying drawings.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

FIGURES 1-6

Figure 1:
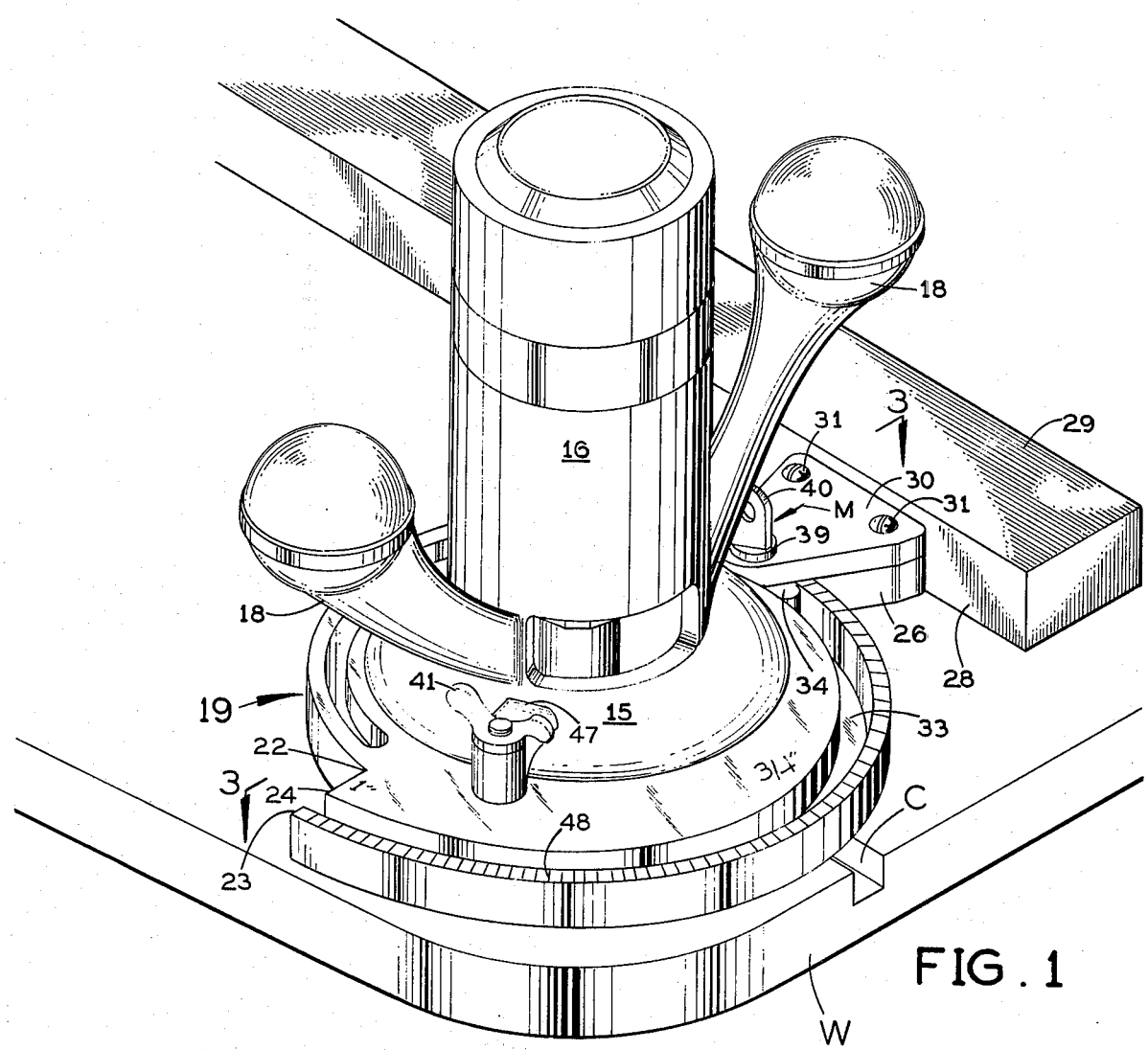
FIG. 1 is a top perspective view showing a first embodiment of the present guide attached to a router.
Figure 4:
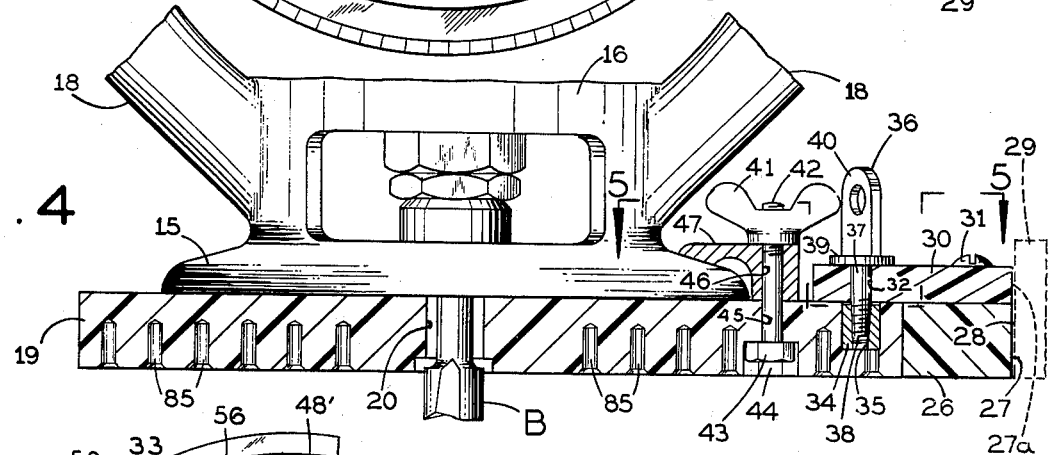
FIG. 4 is a vertical section taken along the line 4—4 in FIG. 3.

Referring to FIG. 1, the router shown there has a flat-bottomed base 15 of circular outline attached to the lower end of a generally cylindrical housing 16 enclosing an electric motor which drives the router bit B (FIG. 4). Handles 18 extend outward and upward from the lower end of housing 16.

In accordance with one aspect of the present invention, the base 15 of the router is mounted on a guide plate 19 having an eccentric or cam shaped periphery which enables the user to conveniently adjust the lateral distance of the router bit B from a flat reference surface so as to properly locate the cut C being made in the underlying workpiece W parallel to that reference surface.

Figure 2:
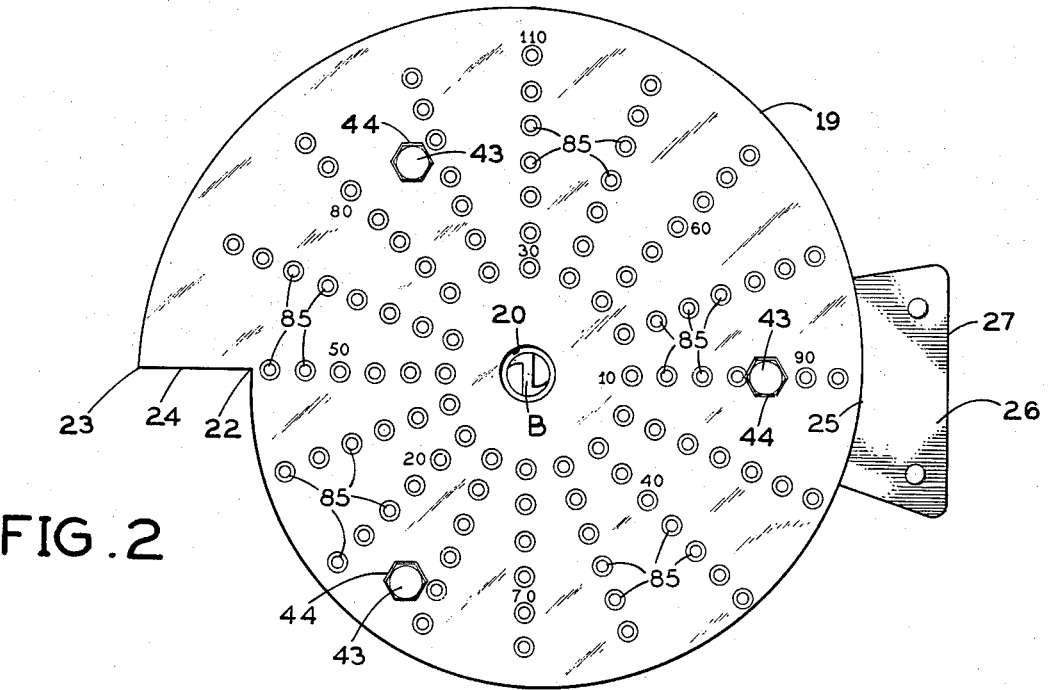
FIG. 2 is a bottom plan view of the present router guide.

Referring to FIG. 2, viewed from the bottom, the guide plate 19 is formed with a counterbored central opening 20 which is aligned axially with the router bit B. As shown in FIG. 4, the bit extends down through this opening. The periphery of the guide plate 19 extends in a smooth spiral curvature from a minimum radius location 22 clockwise in FIG. 1 and counter-clockwise in FIG. 2 with a progressively increasing radius through an eccentric arc of 360 degrees until it reaches the maximum radius location 23, at which point the periphery of the guide plate extends radially inward along the line 24 to the minimum radius point 22.

A slide comprising a slide piece 26 and a top plate 30 is coupled to the guide plate 19 at its eccentric periphery.

The eccentric periphery of the guide plate 19 slidably engages the concave inside face 25 (FIG. 2) of slide piece 26. The slide piece has a flat outer face 27 which lies in a vertical plane extending perpendicular to a radius of the eccentric guide plate 19 passing through the mid-point of the slide piece 26. As shown in FIG. 4, this flat outside face 27 of the slide piece 26 slidably engages the flat inside edge 28 of a straight edge guide 29 clamped to the workpiece W in a known manner. As the router is cutting a straight groove in the workpiece, the slide piece 26 is slid along the edge 28 so that the groove being cut will extend parallel to this edge.

Figure 5:
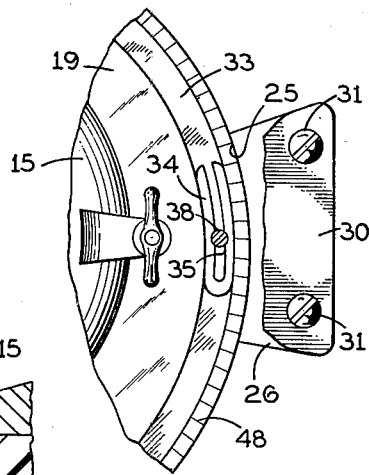
FIG. 5 is a fragmentary horizontal section taken along the line 5—5 in FIG. 4.

As shown in FIG. 4, the eccentric guide plate 19 and the slide piece 26 have the same vertical thickness. The slide piece has the top plate 30 rigidly attached to it by a pair of screws 31. The top plate 30 has a flat outer edge 27a which is co-planar with the edge 27 on the slide piece 26. The top plate 30 partially overlies the guide plate 19 adjacent the curved inside face 25 of the slide piece 26. A vertical circular opening 32 (FIG. 4) in the top plate 30 is vertically aligned with an eccentric groove 33 formed in the top of the eccentric guide plate 19. This groove extends at a fixed distance radially inward from the eccentric periphery of the guide plate, so that the groove itself has a spiral curvature which follows that of the guide plate's periphery throughout the latter's extent. A bifurcated, arcuate wedge piece 34 (FIGS. 4 and 5) is slidably received snugly in the eccentric groove 33 in guide plate 19. This wedge piece is formed with a screw-threaded, vertical opening 35 which, as shown in FIG. 5, intersects the inside of the opposite arcuate legs of the wedge piece 34 about midway along its arcuate length. The wedge piece opening 35 is vertically aligned with the top plate opening 32. A clamping screw 36 presents a cylindrical shank 37 which is rotatably received in the top plate opening 32 and a screw-threaded, tapered stem 38 at its lower end which is threadedly received in the wedge piece opening 35. The clamping screw presents a transverse annular flange 39 which overlies the top plate 30 around the latter's opening 32, and a flat handle 40 extending up from this flange.

With this arrangement, the clamping screw 36 may be turned in one direction to release the slide 26, 30 from clamping engagement with the eccentric guide plate 19, after which the slide can be moved to any desired position along the periphery of the eccentric guide plate, and then the clamping screw 36 can be rotated in the opposite direction to again clamp the slide to the eccentric guide plate 19.

The curved wedge piece 34 cooperates with the groove 33 in the guide plate 19 to maintain the slide piece 26 with its straight edge 27 perpendicular to a radius from the center of the guide plate 19 out to the midpoint of the slide piece 26 at any location of the latter along the periphery of the guide plate. Therefore, the wedge piece 34 and the groove 33 constitute a coupling means acting between the slide and the guide plate 19 to perform this function.

The eccentric guide plate 19 is clamped to the router base by three wing nuts 41 (FIG. 4), each threaded onto the upper end of a respective bolt 42 which has a polygonal head 43 on its lower end seated in a complementary recess 44 formed in the bottom of the eccentric guide plate 19. Each bolt 42 extends rotatably up through a vertical opening 45 in the eccentric guide plate 19 above the hexagonal bottom recess 44 in the latter. Each guide plate opening 45 is located a short distance radially outward beyond the periphery of the router base 15. Each guide plate opening 45 is aligned vertically with an opening 46 formed in a corresponding clamping piece 47 having a radially inwardly projecting lip which overlies the router base 15.

With this arrangement, the wing nuts 41 may be turned in one direction to clamp the eccentric guide plate 19 to the router base 15 or in the opposite direction to release them.

Figure 3:
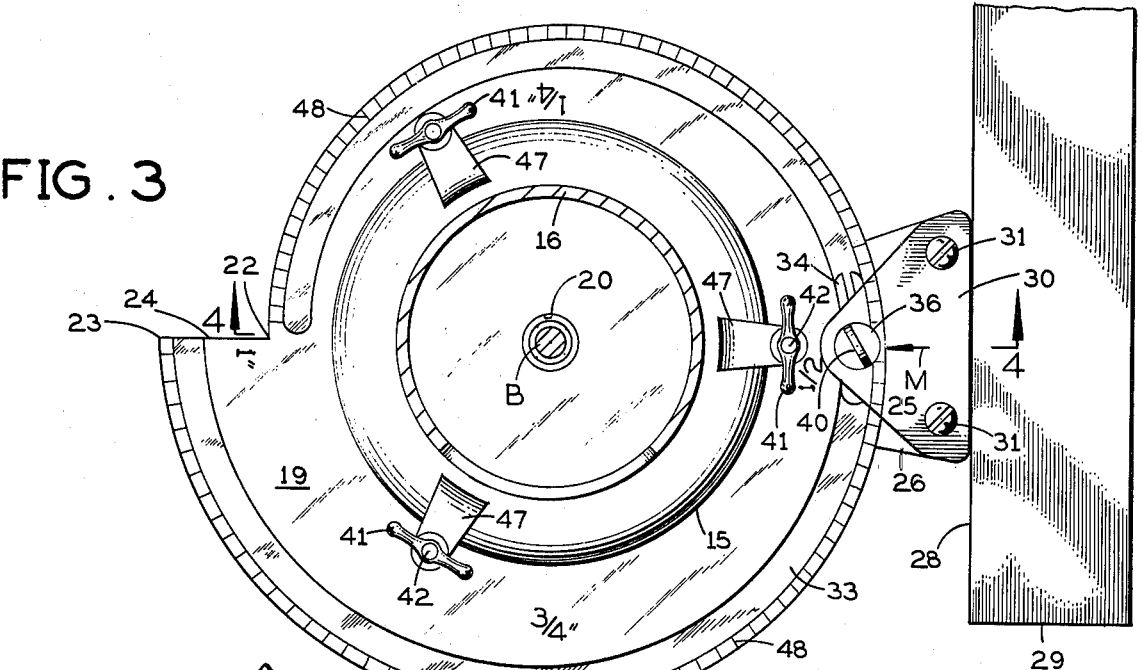
FIG. 3 is a horizontal section taken along the line 3—3 in FIG. 1 and looking down on the router guide.

FIG. 3 illustrates the position of the slide 26, 30 along the eccentric periphery of the guide plate 19 for positioning the cutting tool in the router a predetermined distance away from the straight edge 28. In this position of the parts, the slide may be slid along this edge and the router's cutting tool 21 cuts a groove in the workpiece W parallel to the straight edge 28 at this distance from it.

The groove cut in the workpiece may be widened in a direction away from the straight edge 28 by releasing the slide from the clamping engagement with the eccentric guide plate 19, turning the latter to a new position as shown in full lines in FIG. 6, again clamping the slide to the eccentric guide plate 19, and again sliding the slide piece 26 along the straight edge 28. The slide is shown in phantom in FIG. 6 in the position it occupied previously along the eccentric periphery of the guide plate 19, as shown in FIG. 3. The width D1 of the first groove cut in the workpiece when the slide was in the FIG. 3 position is shown by the arrows at the top of FIG. 6. The increased width D2 of the groove cut in the workpiece after the slide was moved to the position shown in full lines in FIG. 6 is shown by the arrows at the bottom of FIG. 6.

Figure 6:
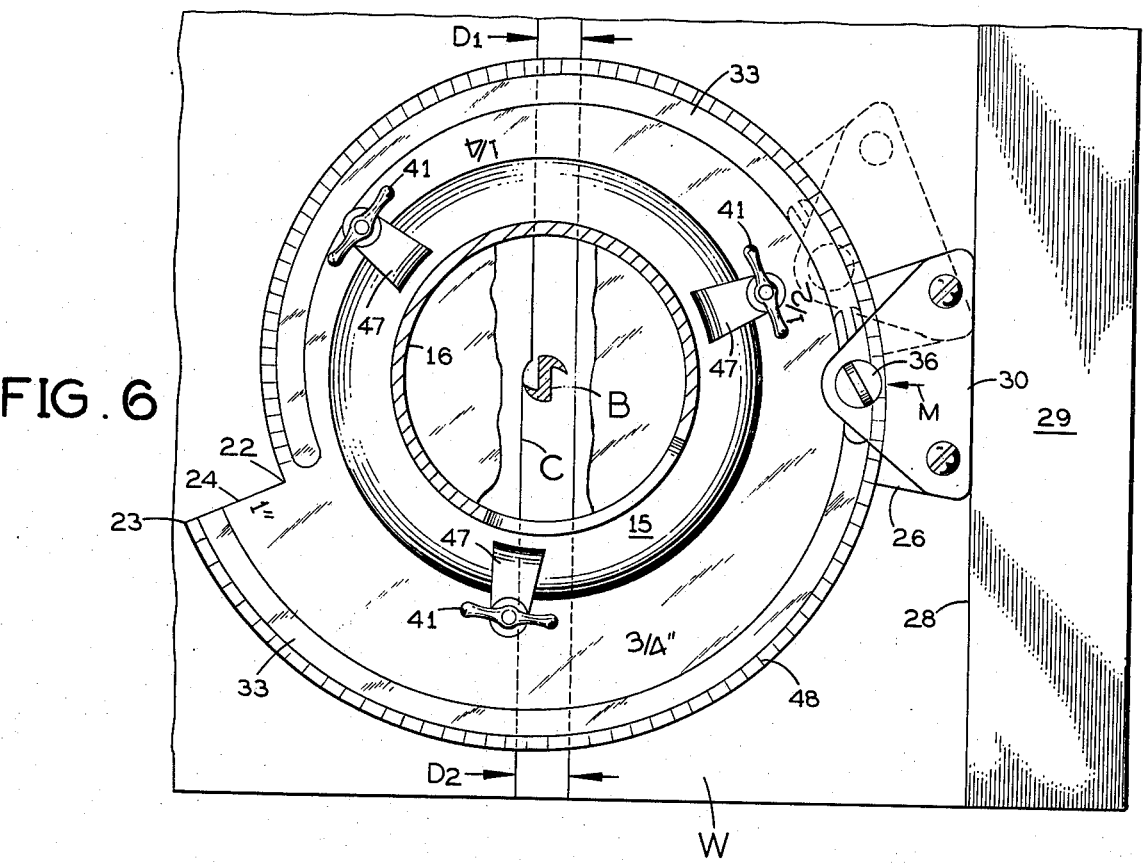
FIG. 6 is a view similar to FIG. 3 and showing the router guide adjusted to a different position.

The groove cut in the workpiece can be widened in the opposite direction (i.e., toward the guide surface 28) by turning the eccentric guide plate 19 clockwise in FIGS. 3 and 6 with respect to the slide, and then clamping the two together in this position. Such adjustments of the position of the guide plate 19 with respect to the slide may be performed as required to produce a straight groove of the desired width and position in the workpiece.

If desired, two or more parallel grooves can be cut in the workpiece by making successive rotational adjustments of the eccentric guide plate 19 with respect to the slide 26, 30.

Before cutting a groove, if the user determines by visual inspection that the location of the groove would not be correct, he can change the position of the groove by adjusting the eccentric guide plate 19, as described, without changing the position of the straight edge guide 29 on the workpiece, which typically would require a series of trial-and-error attempts before the desired groove position would be achieved.

In one practical embodiment, the radial distance between the minimum radius point 22 and the maximum radius point 23 on the eccentric periphery of the guide plate 19 is one inch. The top face of this plate is scribed with 100 indicator lines 48 (FIGS. 3 and 6) which are evenly spaced apart circumferentially along its eccentric periphery to designate radial increments of 1/100 inch between the minimum and maximum radius points. These lines are numbered from "1" to "100". Preferably, also they are marked according to the fractional increment of an inch that they represent. For example, line "10" also is marked 1/10, line "50" is marked "½", and so on.

Preferably, the top plate 30 of the slide is transparent and the slide piece 26 carries a line or mark M midway along its curved inside edge 25 for registration with a selected indicator line 48 on the periphery of the eccentric guide plate 19.

Figure 7:
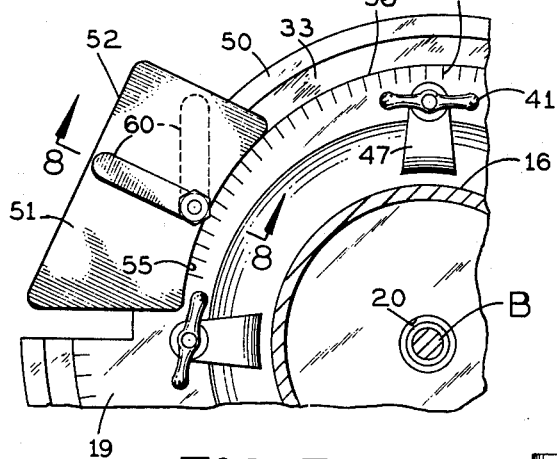
FIG. 7 is a fragmentary view looking down on the router guide and showing a modified clamp arrangement in it.
Figure 8:
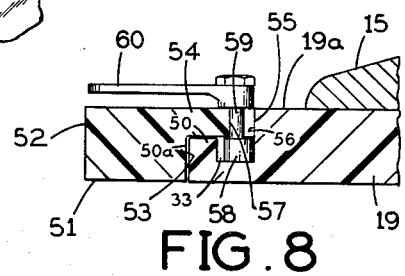
FIG. 8 is a vertical cross-section taken along the line 8—8 in FIG. 7.

FIGURES 7 and 8

FIGS. 7 and 8 show a modified arrangement for coupling the slide to the eccentric guide plate and for releasably clamping them to one another.

In this modified arrangement, the guide plate 19 is generally similar to the one already described in detail with reference to FIGS. 1-6 with certain exceptions. As shown in FIG. 8, the guide plate 19 is of reduced thickness outward from the eccentric groove 33 in its top face, presenting an upwardly extending peripheral lip 50 whose top face is lower than the top face 19a of the rest of the guide plate. With this construction, the guide plate 19 presents a lower eccentric peripheral edge 50a on the outside of its lip 50 and an upper eccentric peripheral edge 56 which is an upward extension or continuation of the inner edge of groove 33. The two eccentric peripheral edges 50a and 56 are parallel to each other.

The slide in this embodiment is a one-piece slide plate 51 having a flat outer edge 52 for sliding engagement with the straight edge surface 28. For part of its extent inward from this edge 52, the slide plate 51 is of the same vertical thickness as the main body of the eccentric guide plate 19, as shown in FIG. 8. It presents a concave inside surface 53 in close, confronting relationship to the eccentric lower peripheral edge 50a of the guide plate, and above this surface it presents an inwardly extending top lip 54 which overlies the top face of the peripheral lip 50 of the guide plate and the eccentric groove 33 in the latter. This inner lip 54 of the slide plate 51 terminates in a concave inside edge 55 which, as shown in FIG. 7, is substantially complementary to the upper eccentric peripheral edge 56 of the guide plate 19. The evenly spaced calibration lines 48 appear on the eccentric guide plate 19 adjacent this upper peripheral edge 56.

The inner lip 54 on the slide plate 51 is formed with a vertical opening 57 (FIG. 8) which registers with the eccentric groove 33 in guide plate 19. A locking cam 58 is slidably positioned in the groove 33 and it has an upwardly projecting shank 59 which is rotatably received in the slide plate opening 57. A handle 60 is attached to this shank above the slide plate 51 in any suitable fashion. By turning the handle from the full line position in FIG. 7 to the dashed line position, the cam 58 is turned from a position in which it is freely slidable along the guide plate groove 33 to a position of locking engagement with this groove.

With this arrangement, the groove 33 and cam 58 provide the desired coupling between the eccentric guide plate 19 and the slide 51 to maintain the latter's outer face 52 perpendicular to a radius from the center of the guide plate out to the midpoint of the slide in any position of the slide along the eccentric periphery of the guide plate. Also, the cam 58 may be turned by handle 50 to clamp the slide 51 to the guide plate 19 at any desired location along the latter's eccentric periphery.

Figure 9:
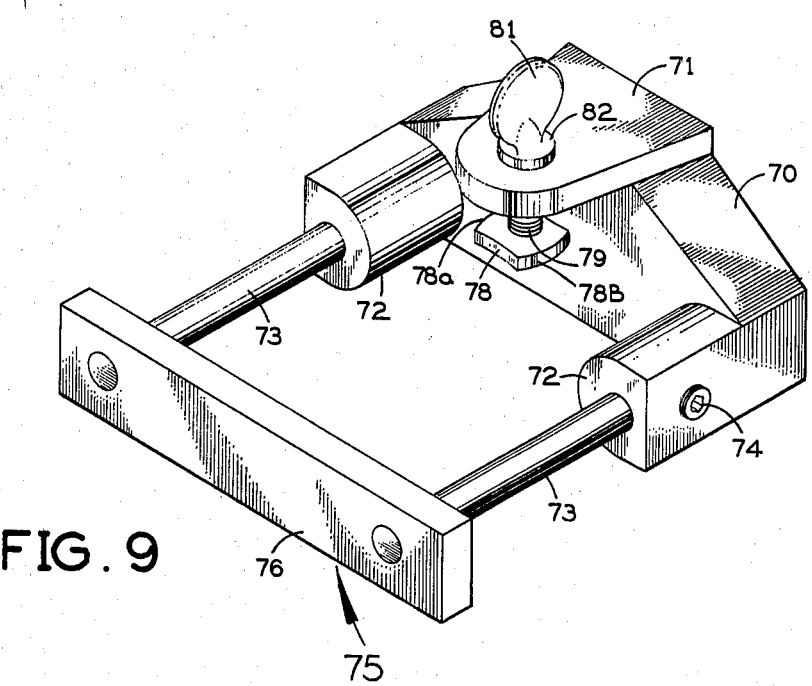
FIG. 9 is a fragmentary perspective view showing a modified edge guide arrangement in the present router guide.
Figure 10:
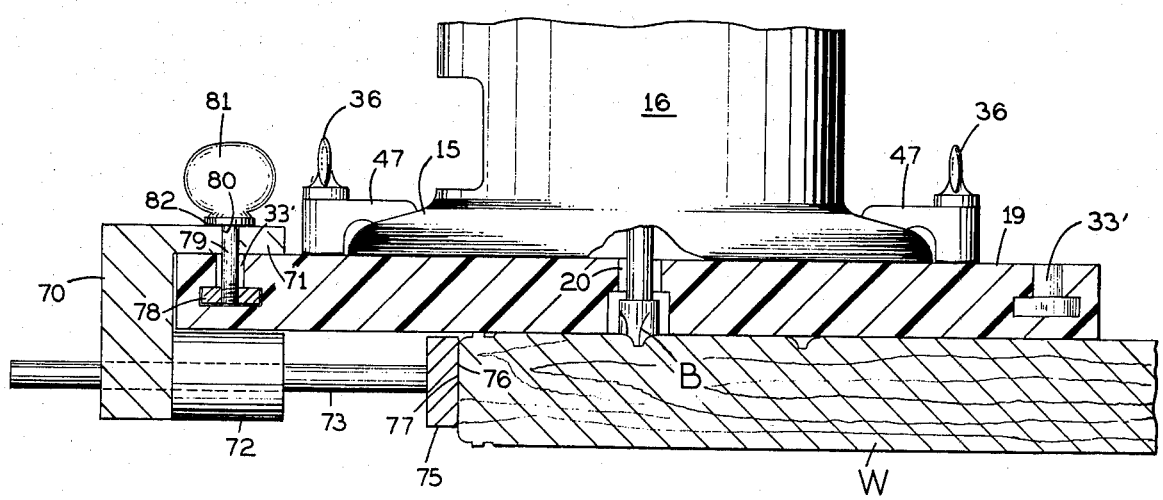
FIG. 10 is a view similar to FIG. 4 and showing how the edge guide arrangement of FIG. 9 cooperates with the workpiece.

FIGURES 9 and 10

FIGS. 9 and 10 show a modified arrangement in which the flat surface on the slide faces inward (i.e., toward the router bit) instead of outward. This arrangement is advantageous for use when an edge of the workpiece itself is the reference surface for guiding the router along a path parallel to it.

Referring to FIG. 9, the slide piece 70 has a centrally located, inwardly projecting flat lip 71 at the top which, as shown in FIG. 10, closely overlies the eccentric guide plate 19 on both sides of the eccentric groove 33' in the latter. This groove extends parallel to the eccentric peripheral edge of the guide plate 19 and it is of inverted T-shaped cross-section. At its opposite ends the slide piece 70 presents inwardly projecting guide segments 72 which, as shown in FIG. 10, extend snugly beneath the eccentric guide plate 19. An elongated rod 73 is slidably received in the slide piece at each guide segment 72 and is adapted to be locked in place therein by a respective set screw 74 (FIG. 9). A rectangular bar 75 fastened to the inner ends of the two rods 73 presents a flat inner face 76 for sliding engagement with the adjacent edge 77 of the workpiece W, as shown in FIG. 10.

The coupling between the slide 70 and the eccentric guide plate 19 is provided by a locking cam 78 slidably received in the widened bottom of the groove 33', as shown in FIG. 10. The cam has rounded end faces 78a and 78b at opposite ends of its longer axis, as shown in FIG. 9. This locking cam is screw-threadedly attached to the lower end of a shank 79, which is loosely received in the narrower upper end of groove 33' and is rotatably received snugly in a vertical opening 80 formed in the inner lip 71 of the slide piece 70. A finger grip 81 on the upper end of the shank 79 presents a flat annular flange 82 directly overlying the slide piece lip 71 around the opening 80 therein.

The locking cam can be turned to a position in which its longer axis extends lengthwise of the groove 33' and its narrower dimension extends radially. In this position, the cam 78 is freely slidable along the groove 33'. However, when turned from this position its rounded opposite ends 78a and 78b become wedged against the opposite sides of the groove 33' to clamp the slide to the guide plate 19.

With this arrangement, the cam 78 coacts with the eccentric groove 33' in the guide plate 19 to maintain the flat surface 76 on the slide perpendicular to a radius from the center of the guide plate 19 out to the midpoint of the slide in all positions of the slide along the periphery of the guide plate. Also, the cam coacts with the groove for releasably locking the slide at any selected position circumferentially along the guide plate 19.

I claim:
1. An adjustable guide for a router having a motor-driven bit, said guide comprising:
   a guide plate having a central opening for passing the router bit and an eccentric peripheral edge which progresses along a uniform spiral path from a point of minimum radius from the center of the guide plate to a point of maximum radius therefrom;
   a slide extending beyond said peripheral edge of the guide plate at a particular location therealong and having an exposed straight edge;
   coupling means acting between said slide and said guide plate for maintaining said straight edge of the slide perpendicular to a radius from the center of the guide plate to said slide at all positions of the latter along the eccentric peripheral edge of the guide plate;
   and means for releasably clamping said slide and said guide plate together at any selected position of the slide along the eccentric peripheral edge of the guide plate.

2. A router guide according to claim 1, wherein said straight edge on the slide faces outward away from said central opening in the guide plate.

3. A router guide according to claim 1, wherein said straight edge on the slide faces inward toward said central opening in the guide plate.

4. A router guide according to claim 3, and further comprising means for adjusting the position of said straight edge radially of the guide plate.

5. A router guide according to claim 1, wherein said coupling means comprises:
means defining an eccentric groove in said guide plate which extends parallel to its eccentric peripheral edge;
a locking member slidably received in said groove;
and means operatively connecting said locking member to said slide to position the latter along the eccentric peripheral edge of the guide plate in accordance with the position of the locking member along said groove.

6. A router guide according to claim 5, wherein:
said locking member is a bifurcated arcuate wedge piece having opposite curved legs;
and said means operatively connecting said locking member to said slide includes a screw threadedly engaging said locking member between its legs for spreading them apart to lock said locking member frictionally in said groove in the guide plate.

7. A router guide according to claim 5, wherein:
said locking member is a cam;
and said means operatively coupling said locking member to said slide means comprises means for turning said cam from a rotational position in which it is freely slidable along said groove to a rotational position in which it is wedged in the groove.

8. A router guide according to claim 5, wherein said slide comprises:
a slide piece having the same vertical thickness as said guide plate and having its top face in the same horizontal plane as the top face of the guide plate;
and a top plate fastened to the top of said slide piece and extending therefrom laterally inward across said groove;
and further comprising an operating member for said locking member extending rotatably down through said top plate into said groove in the guide plate and operatively connected at its lower end to said locking member.

9. A router guide according to claim 8, wherein:
said locking member is a bifurcated arcuate member having opposite curved legs which are slidably received in said groove;
and said operating member extends down between said opposite legs and is rotatable in one direction to spread said legs apart tightly against the opposite sides of said groove.

10. A router guide according to claim 9, wherein said operating member has a tapered screw-threaded lower end threadedly engaging the inside of said legs.

11. A router guide according to claim 10, wherein said straight edge is formed on said slide piece and faces outward away from said central opening in said guide plate.

12. A router guide according to claim 5, wherein:
said guide plate presents a peripheral lip of reduced thickness outward from said groove;
said slide has an inwardly extending top segment which overlies said peripheral lip and said groove;
and said locking member is a cam located in said groove below said inwardly extending top segment of the slide;
and further comprising an operating member for said cam extending rotatably down through said inwardly extending top segment of the slide and operatively connected at its lower end to said cam.

13. A router guide according to claim 5, wherein said slide extends laterally inward beneath said guide plate and presents said straight edge below the guide plate facing inward toward said central opening in the guide plate.

14. A router guide according to claim 13, and further comprising means on the slide for selectively adjusting the position of said straight edge radially of the guide plate.

* * * * *